United States Patent [19]

Smith

[11] 4,352,584
[45] Oct. 5, 1982

[54] METHOD OF PRODUCING A JOINT CAPABLE OF TRANSMITTING HIGH TORQUE

[75] Inventor: Derek R. Smith, Bristol, England

[73] Assignee: Union Carbide Corporation, Danbury, Conn.

[21] Appl. No.: 74,432

[22] Filed: Sep. 12, 1979

Related U.S. Application Data

[60] Division of Ser. No. 954,112, Oct. 24, 1978, Pat. No. 4,190,479, which is a continuation of Ser. No. 753,819, Dec. 23, 1976, abandoned.

[51] Int. Cl.³ .............................................. F16D 1/00
[52] U.S. Cl. ..................................... 403/13; 403/268
[58] Field of Search ................... 403/13, 14, 268, 361; 285/331

[56] References Cited

U.S. PATENT DOCUMENTS

| | | | |
|---|---|---|---|
| 332,754 | 12/1885 | Scott | 285/331 |
| 1,951,122 | 3/1934 | Balze | 285/331 X |
| 2,785,100 | 3/1957 | Yaw | |
| 3,331,621 | 7/1967 | Bagnulo | |
| 3,606,401 | 9/1971 | Schwarz | |
| 3,907,446 | 9/1975 | Leslie | 285/22 X |
| 3,909,045 | 9/1975 | Meagher | 285/374 X |
| 3,940,948 | 3/1976 | Schultenkamper | 64/17 R |
| 3,960,394 | 6/1976 | Hubner et al. | 285/297 |
| 3,997,195 | 12/1976 | Bartholomew | |
| 4,026,581 | 5/1977 | Pasbrig | |
| 4,041,599 | 8/1977 | Smith | 403/268 X |
| 4,052,990 | 10/1977 | Dodgson | |
| 4,190,479 | 2/1980 | Smith | 403/268 X |

FOREIGN PATENT DOCUMENTS

| | | | |
|---|---|---|---|
| 1114386 | 12/1955 | France | 403/268 |
| 986882 | 3/1965 | United Kingdom | |
| 1113694 | 5/1968 | United Kingdom | |

*Primary Examiner*—Andrew V. Kundrat
*Attorney, Agent, or Firm*—John R. Doherty

[57] ABSTRACT

A method for bonding a tubular shaft to an end fitting to produce an assembly wherein the shaft and the end fitting are in axial alignment and which is capable of transmitting high torque, said method employing an end fitting provided with a mating section having two concentric cylindrical walls which describe an annular cavity or socket adapted to receive the tubular shaft therein. The high torque carrying capacity of the joint produced in accordance with the invention results from the fact that the shaft is bonded to the mating section of the end fitting on both its interior and exterior surfaces and is in axial alignment with the end fitting. Such axial alignment results from the presence of a resilient sealing ring and an annular shoulder, positioned near the top and base of the inner cylindrical wall of the mating section, which contact the inner surface of the tubular shaft and center the shaft around said wall when the shaft is inserted into the bonding socket of the end fitting.

4 Claims, 2 Drawing Figures

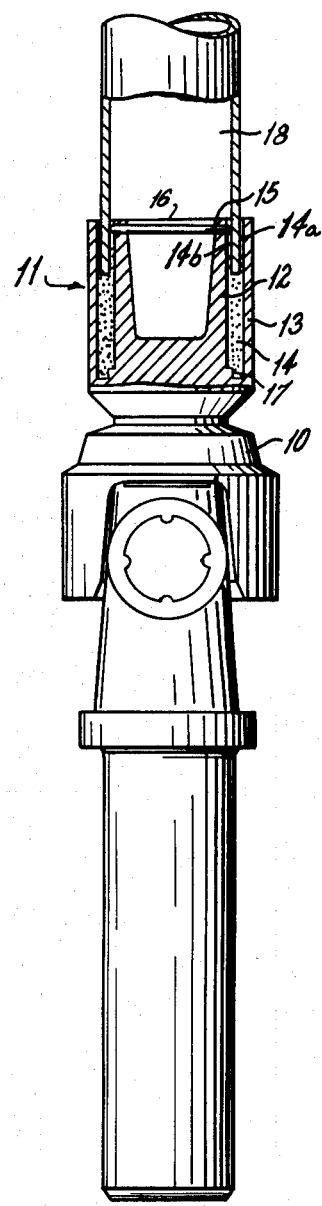
FIG. IA
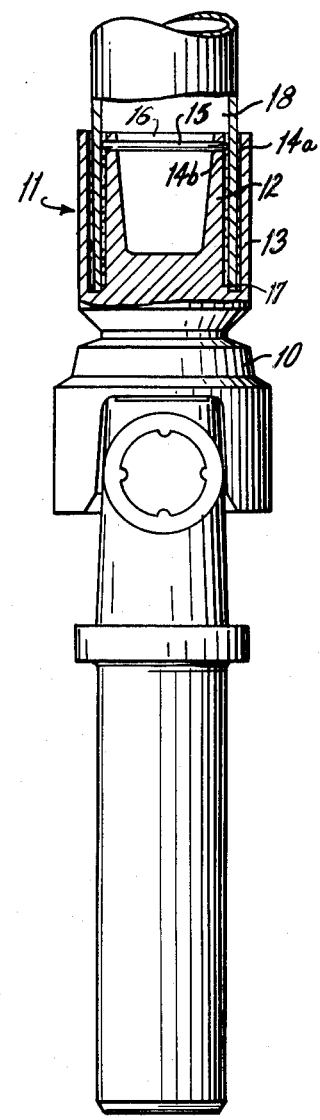
FIG. IB

METHOD OF PRODUCING A JOINT CAPABLE OF TRANSMITTING HIGH TORQUE

This application is a division of our prior U.S. application Ser. No. 954,112, filed 10/24/78, now U.S. Pat. No. 4,190,479, which is a continuation of application Ser. No. 753,819, filed 12/23/76, now abandoned.

BACKGROUND OF THE INVENTION

This invention relates to a method of bonding a tubular shaft to an end fitting to produce a joint which assures axial alignment of the shaft and the end fitting and is capable of transmitting a high torque.

One obvious method of bonding a tubular shaft to an end fitting is to provide the end fitting with a rod-shaped mating section which fits into the shaft, coat the mating section and/or the inner circumference of the shaft with a suitable cement or bonding agent, and then insert the mating section into the shaft. However, this method suffers from the disadvantage that the bonding agent employed tends to rub off the mating section when it is inserted into the shaft if too tight a fit is provided, or, alternatively, is accompanied by leakage of the bonding agent from the annular space between the mating section and the shaft if the fit is too loose. In any event, the end result is a loss of bonding agent and a weakening of the joint, so that the desired degree of bonding is not attained. Furthermore, in certain instances, as in the case of the bonding of a universal joint fitting in a drive shaft, it is essential that the fitting be aligned concentrically in the shaft, and this method does not provide for obtaining a secure joint having such concentric alignment.

An alternative method of bonding a tubular shaft to an end fitting having a rod-shaped mating section is to first insert the mating section into the shaft, and then inject the bonding agent into the annular space between the mating section and the shaft from a hole in the side of the shaft. A second hole in the side of the shaft is also necessary in such case, of course, to allow for the release of air displaced by the bonding agent. However, not only is this technique quite slow, but oftentimes it fails to completely fill the annular space between the mating section and the shaft with bonding agent, resulting in voids between them and a poor bond. Visual inspection of the joint, of course, is not possible, so that the presence of such voids, and the resulting poor bond, goes undetected.

One very effective way of bonding a tubular shaft to an end fitting having a rod-shaped mating section is disclosed in copending application Ser. No. 676,866, now U.S. Pat. No. 4,041,599. Said method comprises: (1) fitting a pair of parallel annular grooves positioned near the base and top of the mating section of the end fitting with a pair of resilient sealing rings having inner diameters such that they are retained in place by the grooves and outer diameters greater than that of the mating section, said sealing rings being designed to fit snugly into the tubular shaft and form a tight fit between the mating section and the shaft; (2) inserting the base of the mating section containing the first of said resilient sealing rings into one end of the tubular shaft so as to compress said resilient sealing ring snugly between the mating section and the inner circumference of that end of said tubular shaft, said end of said tubular shaft having the neck of a funnel tightly fitted about its outer circumference; (3) filling the funnel with a suitable liquid bonding agent; (4) further inserting the mating section of the end fitting into the tubular shaft, thereby creating a vacuum in the annular spacing between said mating section and said tubular shaft so as to cause the bonding agent in the funnel to flow into and fill said annular spacing; (5) continuing to insert the mating section of the end fitting into the tubular shaft until the annular space between said mating section and said tubular shaft has been completely filled with bonding agent and the second resilient sealing ring at the top of the mating section has been forced into the shaft and snugly compressed between said mating section and said tubular shaft, thereby entrapping and sealing said bonding agent in said annular space, and (6) curing said bonding agent to the thermoset state so as to bond the shaft and the mating section of the end fitting together. Not only does this method provide a secure bond between the mating section of the end fitting and the shaft, but it also assures accurate centering of the mating section in the shaft. For this reason it is particularly suitable whenever concentric alignment of the mating section of an end fitting in a shaft is necessary, such as when the mating section of a universal joint fitting is bonded to a drive shaft. However, while the joint produced in this manner has been found satisfactory for most applications and capable of transmitting relatively high torque loads, it has not been found satisfactory for transmitting extremely high torque loads. Thus, although fully acceptable as a bond between a universal joint fitting and a drive shaft when such assembly is used in automobiles, the joint produced in this manner has been found wanting when such assembly is used in trucks.

SUMMARY OF THE INVENTION

The present invention provides a method for securely bonding a tubular shaft to an end fitting to produce an assembly wherein the shaft and end fitting are in axial alignment and which is capable of transmitting high torque, which method makes use of an end fitting provided with a mating section having two concentric cylindrical walls which describe an annular cavity or socket adapted to receive the tubular shaft therein. Said process comprises: (1) fitting an annular groove positioned near the top of the inner cylindrical wall of the mating section of the end fitting with a resilient sealing ring having an inner diameter such that it is retained in place by the groove and an outer diameter greater than that of the outer diameter of said inner cylindrical wall, said sealing ring being designed to fit snugly into the tubular shaft and form a tight fit between said inner cylindrical wall and the shaft; (2) filling the annular cavity between the inner and outer cylindrical walls of the mating section of the end fitting with a suitable liquid bonding agent; (3) inserting one end of the tubular shaft into the annular cavity between the inner and outer cylindrical walls of the mating section of the end fitting so as to compress the resilient sealing ring at the top of the inner cylindrical wall snugly between said inner cylindrical wall and the inner circumference of the tubular shaft and effect a seal therebetween; (4) further inserting the tubular shaft into the annular cavity between the inner and outer cylindrical walls of the mating section of the end fitting, thereby displacing excess bonding agent present in the annular cavity and causing said excess bonding agent to flow out of said annular cavity via the space between the outer circumference of the tubular shaft and the inner circumference of the outer cylindrical wall of the mating section; (5)

continuing to insert the tubular shaft into the annular cavity between the inner and outer cylindrical walls of the mating section of the end fitting until said tubular shaft has been forced into place over an annular shoulder positioned near the base of the inner cylindrical wall, said annular shoulder having an outer diameter greater than that of the outer diameter of said inner cylindrical wall and being designed to fit snugly into the tubular shaft and form a tight fit between said inner cylindrical wall and the inner circumference of said tubular shaft; and (6) curing said bonding agent to the thermoset state so as to bond the shaft and the mating section of the end fitting together in axial alignment.

BRIEF DESCRIPTION OF THE INVENTION

FIG. 1a is a partial cutaway elevation view showing a universal joint having a mating section provided with a bonding socket adapted to receive a tubular drive shaft as such a shaft is being inserted into the bonding socket.

FIG. 1b is a partial cutaway elevation view showing the universal joint and tubular drive shaft of FIG. 1a after the tubular shaft has been fully inserted into the bonding socket and bonded to the mating section of the universal joint.

DETAILED DESCRIPTION OF THE INVENTION

While the invention is generally useful whenever secure bonding of a tubular shaft to an end fitting is desired, it is particularly applicable whenever the assembly is required to carry a very high torque load, such as when a universal joint fitting is bonded to a drive shaft and the assembly is employed as part of the drive train system of a truck. The high torque carrying capacity of the joint produced in accordance with the invention results from the fact that the shaft is bonded to the mating section of the end fitting on both its interior and exterior surfaces and is in axial alignment with the end fitting. Such axial alignment of the shaft and the end fitting results from the presence of the resilient sealing ring positioned near the top of the inner cylindrical wall of the mating section, and the annular shoulder positioned near the base of said inner cylindrical wall, which contact the inner surface of the tubular shaft and center the shaft around said wall when the shaft is inserted into the bonding socket of the end fitting. In addition to centering the shaft and retaining it in proper geometric relationship to the inner cylindrical wall, the resilient sealing ring and annular shoulder serve to retain and prevent leakage of bonding agent present in the space between said wall and the inner surface of the shaft.

Referring now to the drawings, universal joint 10 is provided with a mating section 11 having an inner cylindrical wall 12 and a concentric outer cylindrical wall 13 which together describe an annular cavity or socket 14. Positioned around the outer circumference of the inner cylindrical wall near its top is a rubber sealing ring 15. Ring 15 has an inner diameter such that it is retained in place by means of an annular groove (not shown) in inner cylindrical wall 12 and an outer diameter slightly greater than that of the outer diameter of said inner cylindrical wall. Preferably, annular shoulder 16 is positioned around the outer circumference of the inner cylindrical wall adjacent to and above ring 15 and serves as a backing for said ring. Positioned around the outer circumference of the inner cylindrical wall near its base and parallel to rubber sealing ring 15 is annular shoulder 17. Annular shoulder 17 has an outer diameter slightly greater than that of the outer diameter of inner cylindrical wall 12 and may either be an integral part of the inner cylindrical wall or a second sealing ring held in place on the inner cylindrical wall in the same manner as sealing ring 15. Both ring 15 and shoulder 17 have outer diameters such that they will fit snugly and form a tight fit between the outer circumference of inner cylindrical wall 12 and the inner circumference of tubular carbon fiber-reinforced epoxy drive shaft 18 when tubular shaft 18 is inserted into the annular space between inner cylindrical wall 12 and outer cylindrical wall 13. Inner cylindrical wall 12 has an outer diameter of 4.534 inches. Outer cylindrical wall 13 has an inner diameter of 5.234 inches. Together the two walls describe an annular cavity or bonding socket 0.350 inches wide and 4.500 inches long. Tubular shaft 18 has an inner diameter of 4.574 inches, an outer diameter of 5.074 inches, and is 0.250 inches wide. Ring 15 and shoulder 17 are spaced 4.200 inches apart.

After annular cavity 14 between the outer circumference of inner cylindrical wall 12 and the inner circumference of outer cylindrical wall 13 is filled with a suitable liquid bonding agent, tubular shaft 18 is inserted into the annular cavity and fitted snugly over rubber sealing ring 15 positioned near the top of cylindrical wall 12. Rubber sealing ring 15 is thereby compressed so that it fits snugly between the outer circumference of inner cylindrical wall 12 and the inner circumference of tubular shaft 18 and bonding agent present in annular cavity 14 is precluded from escaping between said shaft and said inner cylindrical wall. As a result, as tubular shaft 18 is further inserted into annular cavity 14, any bonding agent displaced from the annular cavity is forced to flow out via the space between the outer circumference of tubular shaft 18 and the inner circumference of outer cylindrical wall 13 (annular space 14a). At the same time, the vacuum seal created by sealing ring 15 ensures that the space between the shaft and the inner cylindrical wall (annular space 14b) remains filled with bording agent as the shaft is inserted into the annular cavity. Finally tubular shaft 18 is forced into place over annular shoulder 17 which, like sealing ring 15, fits tightly between the outer circumference of inner cylindrical wall 12 and the inner circumference of tubular shaft 18. As a result, the bonding agent present betwen the shaft and the inner cylindrical wall is now permanently entrapped therebetween. In addition to preventing escape or leakage of bonding agent present between the shaft and the inner cylindrical wall, ring 15 and annular shoulder 17 ensure that the shaft is in axial alignment with the inner cylindrical wall.

In order to facilitate insertion of tubular shaft 18 into annular cavity 14, the inner and outer surfaces of the end of the tubular shaft to be inserted into the annular cavity are preferably coated with the bonding agent before the shaft is inserted into the cavity. To secure a better bond between the tubular shaft and the walls of the cavity, it is also preferred that the surfaces of the tubular shaft which are to be inserted into the cavity be abraded, and that the walls of the cavity be etched with acid.

After tubular shaft 18 has been fully inserted into annular cavity 14 and forced into place over annular shoulder 17, any excess bonding agent on the exterior of shaft 18 may be wiped away. The bonding agent in annular space 14 is then cured, thereby completing the process. If desired, a similar attachment may be made at the other end of the shaft. In such case, a hole should first be made in the mating section of said attachment to allow for the escape of air when the shaft is inserted into said mating section.

In order to ensure axial alignment and proper bonding of the shaft and the end fitting, the radial space between the two concentric cylindrical walls of the mating section of the end fitting is preferably between 0.260 inches and 0.360 inches, and the wall of the shaft is between 0.240 inches and 0.300 inches thick. Most preferably, a spacing of 0.350 inches is provided between the two concentric cylindrical walls, the wall of the shaft is 0.250 inches thick, and the outer diameters of the sealing ring and annular shoulder about the top and bottom inner cylindrical wall are such that when the shaft is positioned on the sealing ring and annular shoulder, and thereby concentrically aligned between the two walls, there is a spacing of from 0.010 and 0.030 inches between the shaft and the inner cylindrical wall, most preferably 0.020 inches. The annular cavity between the two concentric walls is suitably 4.500 inches long.

Any low viscosity liquid bonding agent capable of adhering to both the mating section of the end fitting and the tubular shaft can be employed in the process of the present invention, provided that such bonding agent does not give off volatiles on curing. An epoxy resin binder system is preferred because of its ability to adhere to a widespread number of materials and its good bonding characteristics. Such system comprises an epoxy resin together with a reactive resin hardener and/or an epoxy polymerization catalyst in an amount conventionally used in the art to cure epoxy resins.

The following example is set forth for purposes of illustration so that those skilled in the art may better understand this invention. It should be understood that it is exemplary only, and should not be construed as limiting this invention in any manner.

EXAMPLE

The process of the invention was employed to axially align and bond a tubular shaft to an end fitting to produce an assembly capable of transmitting high torque. The tubular shaft selected was a carbon fiber-reinforced epoxy drive shaft, and the end fitting employed was a universal joint which was provided with a mating section having two concentric cylindrical walls which together described an annular cavity or socket adapted to receive the tubular shaft. The inner cylindrical wall had an outer diameter of 4.534 inches, the outer cylindrical wall had an inner diameter of 5.234 inches, and the annular cavity or socket between the two walls was 0.350 inches wide and 4.500 inches long. A rubber "O" ring was fitted around the outer circumference of the inner cylindrical wall near the top of said wall. The "O" ring had an inner diameter such that it was retained in place by means of an annular groove in the inner cylindrical wall and an outer diameter slightly greater than that of the outer diameter of said inner cylindrical wall. Positioned around the outer circumference of the inner cylindrical wall, adjacent to and above the "O" ring, was an annular shoulder which formed an integral part of the wall and served as a backing for said ring. Positioned around the outer circumference of the inner cylindrical wall near its base, parallel to the rubber "O" ring near the top of said wall and 4.200 inches apart from it, was a second annular shoulder which also formed an integral part of the wall and which, like the "O" ring, had an outer diameter slightly greater than that of the inner cylindrical wall.

The universal joint was placed vertically with the mating section at the top and the annular cavity between the inner and outer cylindrical walls of the mating section was filled with an epoxy resin binder system composed of one hundred (100) parts by weight of a commercially available liquid epoxy resin produced by the reaction of epichlorohydrin and 2,2-bis(hydroxyphenyl)propane (Epikote 828, manufactured by Shell Chemicals U.K. Ltd.) and twenty-seven (27) parts by weight of a diaminodiphenylmethane (DDM epoxy resin hardener, manufactured by Anchor Chemical Co, U.K. Ltd.). This binder system was also used to coat the inner and outer surfaces of one end of a tubular carbon fiber-reinforced epoxy drive shaft which had an inner diameter of 4.574 inches, an outer diameter of 5.074 inches, and was designed to fit into the annular cavity between the inner and outer cylindrical walls of the mating section of the universal joint (the coating was applied only to the portion of the drive shaft which was to be inserted into the annular space). The coated end of the drive shaft was then inserted into the annular cavity and fitted snugly over the "O" ring at the top of the inner cylindrical wall of the mating section of the universal joint. The shaft was then slowly pushed further into the annular cavity, thereby causing excess bonding agent present in the annular cavity to flow out via the space between the outer circumference of the tubular shaft and the inner circumference of the outer cylindrical wall. Finally, the shaft was pressed snugly into place over the annular shoulder near the base of the inner cylindrical wall of the mating section of the universal joint, thereby effecting a second seal between the inner circumference of the shaft and the outer circumference of the inner cylindrical wall which, together with the seal effected by the "O" ring at the top of the inner cylindrical wall, permanently entrapped the bonding agent which filled the annular space between the two walls so as to prevent escape or leakage of the bonding agent. In addition to preventing escape or leakage of bonding agent present between the shaft and the inner cylindrical wall, the "O" ring and annular shoulder ensure that the shaft is in axial alignment with the inner cylindrical wall.

The exterior of the drive shaft was then wiped free of bonding agent which had exuded from the space between the outer circumference of the tubular shaft and the inner circumference of the outer cylindrical wall of the bonding socket of the mating section of the universal joint when the shaft was inserted into the bonding socket. The bonding agent remaining in the bonding socket was then allowed to stand at room temperature for 15 hours to cause it to solidify. During this time, the universal joint and the attached tubular shaft were kept in a vertical position to prevent the bonding agent from flowing out of the space between the outer circumference of the tubular shaft and the inner circumference of the outer cylindrical wall. After the bonding agent had cured to the solid state, it was post cured by heating at a temperature of 180° C. for 1 hour.

A like universal joint was then attached to the other end of the tubular shaft in like manner. The mating section of the second universal joint contained an air bleed hole positioned in its axis to allow air to escape when the shaft was pushed into it.

What is claimed is:

1. A joint comprising a tubular shaft and an end fitting provided with a mating section having two concentric cylindrical walls which describe an annular cavity, said shaft being positioned in said annular cavity between the two concentric cylindrical walls and bonded to said walls by means of a cured bonding agent, said shaft being axially aligned with said end fitting by means of a resilient sealing ring positioned near the top of the inner cylindrical wall of the mating section of the end fitting and between said inner cylindrical wall and the interior wall of said shaft and a parallel annular shoulder positioned near the base of said inner cylindrical wall, said annular shoulder having an outer diameter which is slightly greater than the diameter of said inner cylindrical wall such that the lower end of said shaft fits snugly over said annular shoulder to thereby enclose and seal off said annular cavity while completely filled by said bonding agent.

2. A joint as in claim 1 wherein an annular shoulder is positioned around the inner cylindrical wall adjacent to and above the resilient sealing ring, which shoulder serves as a backing for said ring.

3. A joint as in claim 1 wherein the radial space between the two concentric cylindrical walls of the mating section of the end fitting is between 0.260 inches and 0.360 inches, the wall of the tubular shaft is between 0.240 inches and 0.300 inches thick, the space between the shaft and the inner cylindrical wall is between 0.010 inches and 0.030 inches, and the annular cavity between the two concentric walls is 4.500 inches long.

4. A joint as in claim 1 wherein the resilient sealing ring on the inner cylindrical wall of the mating section of the end fitting is a rubber "O" ring.

* * * * *

UNITED STATES PATENT AND TRADEMARK OFFICE
CERTIFICATE OF CORRECTION

PATENT NO. : 4,352,584
DATED : October 5, 1982
INVENTOR(S) : Derek R. Smith

It is certified that error appears in the above—identified patent and that said Letters Patent is hereby corrected as shown below:

Column 4, line 42 - "bording" should read -- bonding --.

Column 4, line 47 - "betwen" should read -- between --.

Signed and Sealed this

Twenty-third Day of November 1982

[SEAL]

Attest:

Attesting Officer

GERALD J. MOSSINGHOFF

Commissioner of Patents and Trademarks